(12) United States Patent
Takabayashi

(10) Patent No.: US 11,772,057 B2
(45) Date of Patent: Oct. 3, 2023

(54) FINE BUBBLE GENERATING DEVICE

(71) Applicant: KOYO AGRICULTURE INC., Soka (JP)

(72) Inventor: Ryo Takabayashi, Soka (JP)

(73) Assignee: KOYO AGRICULTURE INC., Soka (JP)

( * ) Notice: Subject to any disclaimer, the term of this patent is extended or adjusted under 35 U.S.C. 154(b) by 40 days.

(21) Appl. No.: 17/045,589

(22) PCT Filed: Apr. 25, 2019

(86) PCT No.: PCT/JP2019/017592
§ 371 (c)(1),
(2) Date: Oct. 6, 2020

(87) PCT Pub. No.: WO2019/212028
PCT Pub. Date: Nov. 7, 2019

(65) Prior Publication Data
US 2021/0023513 A1 Jan. 28, 2021

(30) Foreign Application Priority Data

May 1, 2018 (JP) .................................. 2018-088483

(51) Int. Cl.
*B01F 23/2375* (2022.01)
*B05B 7/04* (2006.01)
(Continued)

(52) U.S. Cl.
CPC ........ *B01F 23/2375* (2022.01); *B01F 23/232* (2022.01); *B01F 23/2326* (2022.01);
(Continued)

(58) Field of Classification Search
CPC B01F 25/3141; B01F 25/4338; B01F 23/232; B01F 25/4335; B05B 7/0483
See application file for complete search history.

(56) References Cited

U.S. PATENT DOCUMENTS 3,481,113 A * 12/1969 Burnham, Sr. .... B01D 46/4281
96/198
4,103,827 A * 8/1978 Kumazawa ........... F23D 11/102
239/499
(Continued)

FOREIGN PATENT DOCUMENTS

CN 101795757 A 8/2010
CN 105682781 A 6/2016
(Continued)

OTHER PUBLICATIONS

International Search Report dated Jun. 18, 2019, issued in counterpart International Application No. PCT/ JP2019/017592. (2 pages).
(Continued)

*Primary Examiner* — Steven M Cernoch
(74) *Attorney, Agent, or Firm* — WHDA, LLP

(57) ABSTRACT

A bubble generating device is disclosed which includes: a bubble generator including a tubular body, a liquid introduction port, a gas introduction port, and a discharge port; and a gas supply unit including a gas supply port, a pressurized gas being supplied to the bubble generator through the gas supply port, wherein the flow passage of the bubble generator extends substantially along a same axis, a plurality of reduced diameter portions each having an inner diameter reduced are provided along a direction along which the liquid flows, and gas-liquid mixing portions are provided downstream of the respective reduced diameter portions in a contiguous manner, each of the gas-liquid mixing portions having an inner diameter larger than a minimum inner diameter of each of the plurality of reduced diameter portions, and the gas introduction port of the bubble generator is formed of a plurality of through holes.

4 Claims, 6 Drawing Sheets

(51) Int. Cl.
  *B01F 25/314* (2022.01)
  *B01F 23/232* (2022.01)
  *B01F 25/433* (2022.01)
  *B01F 23/2326* (2022.01)
(52) U.S. Cl.
  CPC ...... *B01F 25/3141* (2022.01); *B01F 25/4335* (2022.01); *B01F 25/4338* (2022.01); *B05B 7/0483* (2013.01)

(56) References Cited

U.S. PATENT DOCUMENTS

| | | | |
|---|---|---|---|
| 2004/0251566 A1* | 12/2004 | Kozyuk | B01F 25/4335 261/76 |
| 2011/0215174 A1* | 9/2011 | Chen | B05B 1/18 239/310 |

FOREIGN PATENT DOCUMENTS

| | | |
|---|---|---|
| CN | 205850620 U | 1/2017 |
| CN | 107530650 A | 1/2018 |
| JP | 2005-305219 A | 11/2005 |
| JP | 2009-82903 A | 4/2009 |
| JP | 2011-206689 A | 10/2011 |
| JP | 2013-52719 A | 3/2013 |
| JP | 2015-85237 A | 5/2015 |
| JP | 2015-174055 A | 10/2015 |
| KR | 10-2014-0078836 A | 6/2014 |
| KR | 10-2017-0071933 A | 6/2017 |
| KR | 10-2018-0036259 A | 4/2018 |
| TW | 201433363 A | 9/2014 |

OTHER PUBLICATIONS

English Translation of Chinese Office Action dated Dec. 2, 2021, issued in counterpart CN Application No. 201980027162.5. (7 pages).

Search Report dated Nov. 25, 2021, issued in counterpart CN Application No. 201980027162.5. (3 pages).

Office Action dated Dec. 2, 2021, issued in counterpart CN Application No. 201980027162.5. (5 pages).

* cited by examiner

FINE BUBBLE GENERATING DEVICE

TECHNICAL FIELD

The present invention relates to a fine bubble generating device which generates fine bubbles, referred to as so-called "microbubbles" or "nanobubbles", in liquid.

BACKGROUND ART

Fine bubbles having a bubble diameter of less than 50 μm are referred to as so-called "microbubbles" or "nanobubbles", and have characteristics different from those of bubbles having a large diameter, such as bubbles (having a bubble diameter of 1 mm or more) contained in general carbonated water. Examples of the characteristics of fine bubbles may be as follows. Fine bubbles allow a large amount of gas to be dissolved into a liquid, thus increasing the concentration of a dissolved gas, such as dissolved oxygen. The surfaces of bubbles are negatively charged. The fine bubbles allow the large amount of gas, such as air or oxygen, to be dissolved. The fine bubbles have various physiological effects. Therefore, a technique of this kind related to fine bubbles has been used in various fields.

For example, in the field of agriculture, in soil-based agriculture or hydroponics, spraying water containing air formed into fine bubbles to medium allows oxygen to be preferably supplied to roots which are liable to have a shortage of oxygen. Forming air into fine bubbles increases the amount of gas dissolved, and bubbles having a smaller bubble diameter are less likely to burst, thus being stably held in water. As a result, water with a high concentration of dissolved oxygen can be supplied to plants and hence, the plants grow quickly whereby high quality crops can be obtained. Further, it is also reported that increasing the concentration of dissolved oxygen in water causes an effect of suppressing anaerobic bacteria and an effect of controlling insect pests.

Further, in the field of beauty and health, it is known that when water containing air formed into fine bubbles is used for washing hair or skin, such as scalp, fine bubbles selectively adsorb to oil or dirt adhering to hair and the like and hence, high washing effect can be obtained. At this point of operation, fine bubbles having a smaller bubble diameter are allowed to enter clearances between hair roots or hair tissues more easily. Accordingly, it is considered that fine bubbles having a smaller bubble diameter have a higher washing effect. Further, effects are also recognized, such as an effect that blood flow increases due to sensory nerve stimulation caused by fine bubbles, so that blood circulation is promoted.

As a device which generates such fine bubbles, Patent Literature 1 discloses a fine bubble generating device which makes use of an aspirator. This fine bubble generating device is formed of the aspirator and a tubular body. The aspirator has a flow passage which allows a liquid to pass therethrough, and a gas introduction passage through which a suctioned gas is introduced. The tubular body is provided on the liquid discharge port side of this aspirator, and the liquid discharged from the aspirator passes through the tubular body. A protruding ridge having a spiral shape is formed on the inner peripheral wall of this tubular body. In this fine bubble generating device disclosed in Patent Literature 1, a gas is suctioned through the gas introduction passage due to a pressure reduction effect in the aspirator, and is mixed with the liquid passing through the flow passage and, thereafter, is stirred while spirally swirling along the protruding ridge in the tubular body and hence, fine bubbles are generated.

CITATION LIST

Patent Literature

Patent Literature 1: Japanese Patent Laid-Open No. 2005-305219

SUMMARY OF INVENTION

Technical Problem

However, since the fine bubble generating device disclosed in Patent Literature 1 is configured such that a gas is suctioned only due to a reduced pressure caused by the aspirator, and a mixture of the gas and a liquid is stirred by the protruding ridge formed on the inner wall of the tubular body, thus generating fine bubbles, it is actually difficult for the fine bubble generating device to generate a large amount of fine bubbles having a bubble diameter of several tens of micrometers or less.

The present invention has been made under such circumstances, and it is an object of the present invention to provide a fine bubble generating device which can generate a large amount of fine bubbles, that is, which can generate fine bubbles allowing a liquid to have a high concentration of fine bubbles, and having a small bubble diameter of several tens of micrometers or less.

Solution to Problem

To overcome the above-mentioned problem, the present invention is directed to a fine bubble generating device which generates fine bubbles by mixing a liquid continuously supplied from a liquid supply source and a gas supplied from a gas supply unit, and which discharges a gas-liquid mixture obtained by mixing the fine bubbles and the liquid together, the fine bubble generating device including: a bubble generator including a tubular body, a liquid introduction port, a gas introduction port, and a discharge port, the tubular body having a flow passage for the liquid in the tubular body, the liquid being introduced into the flow passage through the liquid introduction port, the gas being introduced into the flow passage through the gas introduction port, the gas-liquid mixture being discharged from the flow passage through the discharge port; and a gas supply unit including a compressor and a gas supply port, the compressor being configured to pressurize the gas, the gas pressurized by the compressor being supplied to the bubble generator through the gas supply port, wherein the flow passage of the bubble generator extends substantially along a same axis from the liquid introduction port to the discharge port, a plurality of reduced diameter portions each having an inner diameter reduced are provided to the flow passage along a direction along which the liquid flows, and gas-liquid mixing portions are provided downstream of the respective reduced diameter portions in a contiguous manner, each of the gas-liquid mixing portions having an inner diameter larger than a minimum inner diameter of each of the plurality of reduced diameter portions, and the gas introduction port of the bubble generator is formed of a plurality of through holes arranged along a circumferential direction of an outer wall of the tubular body, and is provided in a vicinity of a most upstream reduced diameter portion of the plurality of reduced diameter portions provided to the flow passage, and the gas introduction port communicates with the gas supply port of the gas supply unit.

The fine bubble generating device of the present invention is configured such that the flow passage has the plurality of reduced diameter portions and the gas-liquid mixing portions which are contiguous with the respective reduced diameter portions, and a pressurized gas supplied from the gas supply unit is introduced into the flow passage from a portion in the vicinity of the most upstream reduced diameter portion provided to the flow passage. The reduced diameter portion of the flow passage is in a reduced pressure state where a pressure is reduced due to a Venturi effect. Therefore, there is a large pressure difference between a pressure at the reduced diameter portion and a gas pressurized to the atmospheric pressure or more and hence, a large amount of gas is suctioned into the flow passage from the gas introduction port formed in the vicinity of the reduced diameter portion. In the present invention, the gas introduction port is formed of the through holes arranged along the circumferential direction of the outer wall of the tubular body forming the outer periphery of the flow passage and hence, the flow velocity of gas introduced into the flow passage is increased, and the gas forcefully introduced into the flow passage from the through holes causes a strong swirling flow to be produced in the gas-liquid mixing portion which is contiguous with the reduced diameter portion. Accordingly, the large amount of gas is introduced into the flow passage, and the gas and the liquid are mixed with certainty in this flow passage, so that it is possible to obtain a gas-liquid mixture containing a large amount of bubbles. Further, the gas is introduced into the flow passage from the through holes at a high flow velocity, so that the flow velocity of the liquid (gas-liquid mixture) flowing through the flow passage is increased. In the present invention, the plurality of reduced diameter portions and the gas-liquid mixing portions which are contiguous with the respective reduced diameter portions are provided and hence, after the gas-liquid mixture passes through the most upstream reduced diameter portion and gas-liquid mixing portion, the gas-liquid mixture then passes through the reduced diameter portion and gas-liquid mixing portion disposed downstream. At this point of operation, the reduced diameter portion disposed downstream is in a reduced pressure state due to the Venturi effect, so that bubbles in the gas-liquid mixture expand. The gas-liquid mixing portion which is contiguous with this reduced diameter portion has an inner diameter larger than that of the reduced diameter portion, so that the flow velocity reduces, and pressure increases. Accordingly, bubbles which expand once at the reduced diameter portion shrink and collapse in this gas-liquid mixing portion and hence, it is possible to obtain fine bubbles having a smaller bubble diameter. Further, in the present invention, the flow passage of the bubble generator extends substantially along the same axis from the liquid introduction port to the discharge port and hence, the high flow velocity of the gas-liquid mixture flowing through the flow passage is maintained whereby the gas-liquid mixture released from the discharge port is allowed to have a suitable hydraulic pressure. In this specification, "upstream" refers to upstream along the flow direction in the flow passage, that is, the direction toward the liquid supply source, and "downstream" refers to downstream along the flow direction in the flow passage, that is, the direction toward the discharge port.

It is preferable for the fine bubble generating device of the present invention to have the configuration where, in the flow passage of the above-mentioned bubble generator, portions of the tubular body which correspond to the most upstream reduced diameter portion, a gas-liquid mixing portion which is contiguous with the most upstream reduced diameter portion, and a reduced diameter portion which is contiguous with the gas-liquid mixing portion are integrally and coaxially formed. With such a configuration, it is possible to ensure a pressure resistance at the portions (the most upstream reduced diameter portion and the gas-liquid mixing portion) where the largest pressure is applied to the flow passage due to the introduction of the pressurized gas. Therefore, it is possible to prevent that the reduced diameter portion and the gas-liquid mixing portion are separated from each other by the pressure of gas introduced or a forceful swirling flow. Further, portions of the tubular body up to a most upstream gas-liquid mixing portion and the reduced diameter portion which is contiguous with the most upstream gas-liquid mixing portion are integrally and coaxially formed and hence, a high flow velocity of fluid flowing through the flow passage is maintained.

It is preferable for the fine bubble generating device of the present invention to have the configuration where the plurality of reduced diameter portions of the bubble generator are formed such that the minimum inner diameter of the reduced diameter portion disposed downstream is smaller than the minimum inner diameter of the reduced diameter portion disposed upstream. With such a configuration, the bubble diameter can be further reduced, so that it is possible to obtain a gas-liquid mixture containing fine bubbles having a bubble diameter of a nano-order level. In this specification, fine bubbles having a bubble diameter of a nano-order level refer to fine bubbles having a bubble diameter of less than 1 μm.

It is preferable for the fine bubble generating device of the present invention to have the configuration where the gas-liquid mixing portions of the bubble generator are formed such that an inner diameter of a gas-liquid mixing portion disposed downstream is larger than an inner diameter of a gas-liquid mixing portion disposed upstream. The reduced diameter portion disposed downstream is formed to have a smaller minimum inner diameter. By causing the gas-liquid mixing portion which is contiguous with this reduced diameter portion to have a larger inner diameter, a pressure difference between the reduced diameter portion and the gas-liquid mixing portion is increased. Accordingly, bubbles which expand at the reduced diameter portion are caused to rapidly shrink and collapse in the gas-liquid mixing portion and hence, it is possible to obtain fine bubbles having a smaller bubble diameter.

It is preferable for the fine bubble generating device of the present invention to have the configuration where the flow passage of the bubble generator has, from an upstream side to a downstream side of the flow passage, a first reduced diameter portion, a first gas-liquid mixing portion which is contiguous with the first reduced diameter portion, a second reduced diameter portion which is contiguous with the first gas-liquid mixing portion, and a second gas-liquid mixing portion which is contiguous with the second reduced diameter portion, the gas introduction port of the bubble generator is provided in a vicinity of the first reduced diameter portion, and the minimum inner diameter of the second reduced diameter portion is smaller than the minimum inner diameter of the first reduced diameter portion. With such a configuration, it is possible to obtain the device which can generate fine bubbles allowing a liquid to have a high concentration of fine bubbles, and having a bubble diameter of a nano-order level.

It is preferable for the fine bubble generating device of the present invention to have the configuration where the fine bubble generating device further includes a shower head, the shower head being connected to the bubble generator through a hose connected to the discharge port of the bubble generator. The shower head has an effect of increasing hydraulic pressure in the device as a whole before the gas-liquid mixture is released to the outside. Therefore, the amount of bubbles contained in the gas-liquid mixture is increased and hence, it is possible to obtain a gas-liquid mixture where the concentration of fine bubbles in the mixture is high.

Advantageous Effects of Invention

According to the present invention, it is possible to provide the fine bubble generating device having the excellent advantageous effects described below.
(1) It is possible to generate fine bubbles which allow a high concentration of fine bubbles, and which have a small bubble diameter of several tens of micrometers or less.
(2) It is possible to maintain a high hydraulic pressure of the gas-liquid mixture to be released from the discharge port and containing fine bubbles and hence, even when water is introduced into the device at a water pressure at which water is supplied from the water pipe for water supply or the like, for example, the water can be released to the outside of the device in the form of a gas-liquid mixture with the same water pressure or an increased water pressure.
(3) The minimum inner diameter of the reduced diameter portion disposed downstream is set smaller than that of the reduced diameter portion disposed upstream and hence, it is possible to generate fine bubbles having a smaller bubble diameter.
(4) The inner diameter of the gas-liquid mixing portion disposed downstream is set larger than that of the gas-liquid mixing portion disposed upstream and hence, shrinkage and collapse of bubbles are promoted whereby it is possible to generate fine bubbles which are made even finer, that is, fine bubbles having a bubble diameter of a nano-order level.
(5) Further, portions of the tubular body which correspond to the most upstream reduced diameter portion, the gas-liquid mixing portion which is contiguous with the most upstream reduced diameter portion, and the reduced diameter portion which is contiguous with the gas-liquid mixing portion are integrally and coaxially formed and hence, pressure resistance is increased whereby it is possible to obtain a device which can be stably used.

DESCRIPTION OF EMBODIMENTS

Hereinafter, a fine bubble generating device according to a first embodiment of the present invention will be described with reference to FIG. 1 to FIG. 3.

Figure 1:
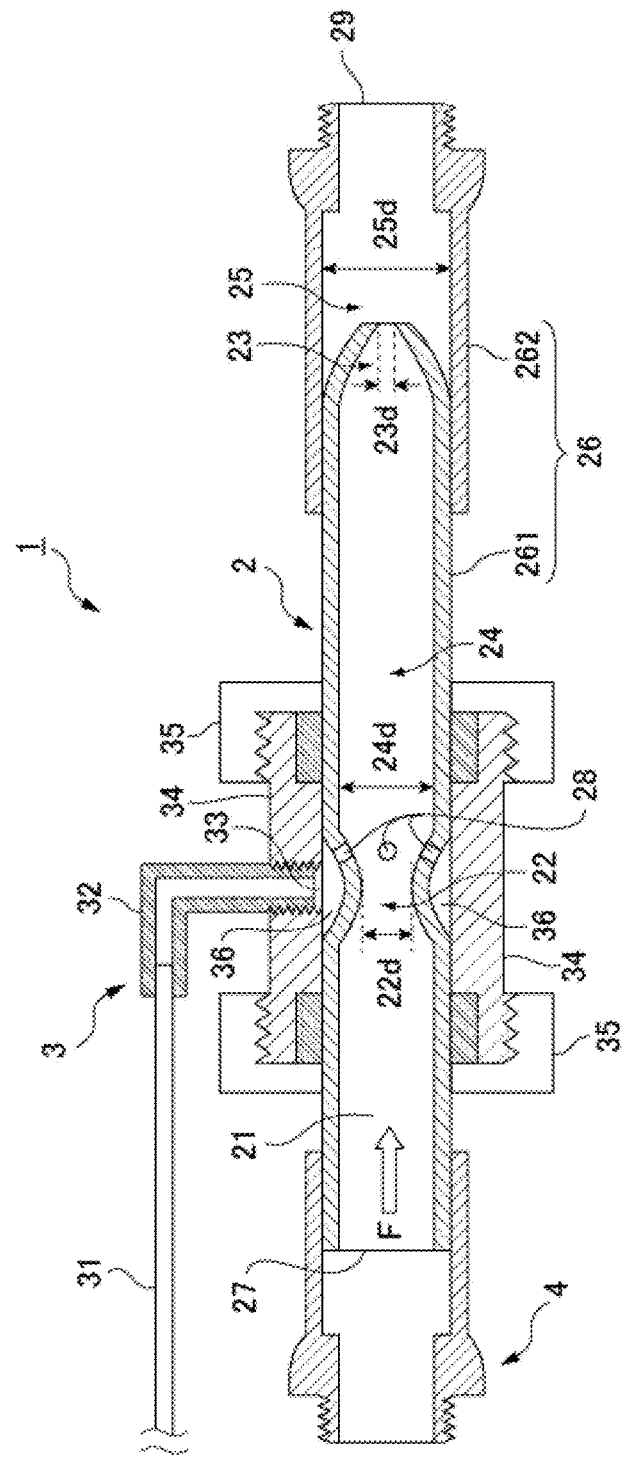
FIG. 1 is a cross-sectional view schematically showing a fine bubble generating device according to a first embodiment of the present invention.

As shown in FIG. 1, a fine bubble generating device 1 according to the first embodiment of the present invention is roughly formed of a bubble generator 2 and a gas supply unit 3. Further, as shown in FIG. 2, the fine bubble generating device 2 according to this embodiment is a device which generates a gas-liquid mixture M in the bubble generator 2 by introducing a liquid supplied in a continuous manner from a faucet 6 for water supply or the like into the bubble generator 2 through a hose and an adaptor 4, and by introducing a pressurized gas G supplied from the gas supply unit 3 into the bubble generator 2. The gas-liquid mixture M discharged from the bubble generator 2 is taken out to the outside via an attachment formed of a shower head 5.

First, the bubble generator 2 will be described with reference to FIG. 1 and FIG. 2. The bubble generator 2 in this embodiment includes a tubular body 26 having a substantially tubular shape. The tubular body 26 has a flow passage 21 formed of a space through which a liquid L or the gas-liquid mixture M flows. This tubular body 26 has a liquid introduction port 27 at an end thereof on the upstream side (a side connected to a liquid supply source), and the liquid introduction port 27 is connected to the faucet 6 or the like, which is the liquid supply source, via the hose, the adaptor 4 and the like. On the other hand, the tubular body 26 has a discharge port 29 at an end thereof on the downstream side, and the gas-liquid mixture M generated in the bubble generator 2 is discharged to the outside through the discharge port 29. The flow passage 21 is formed of the space in the tubular body 26. As will be described later, although the cross-sectional area or the inner diameter of this flow passage 21 varies, the flow passage 21 ranging from the liquid introduction port 27 to the discharge port 29 is formed to extend substantially along the same axis. In other words, the flow passage 21 is formed such that the centers of axial cross sections of the flow passage 21 form a substantially straight line. Therefore, it is possible to suppress the back flow and a reduction in flow velocity of the liquid L or the gas-liquid mixture M which flows in the flow passage 21 in a flow direction F and hence, a smooth flow of the liquid L or the like in the flow passage 21 can be maintained. In this embodiment, the tubular body 26 is formed of a first tubular body 261 and a second tubular body 262. The first tubular body 261 forms an upstream portion of the flow passage 21. The second tubular body 262 forms a downstream portion of the flow passage 21. The inner diameter of the second tubular body 262 is larger than the inner diameter of the first tubular body 261, and the second tubular body 262 has the inner diameter substantially equal to the outer diameter of the first tubular body 261. Therefore, the first tubular body 261 and the second tubular body 262 are connected with each other by causing the inner peripheral surface of the upstream end portion of the second tubular body 262 to be fitted on the outer peripheral surface of the downstream end portion of the first tubular body 261. In this embodiment, the tubular body 26 is formed of two members. However, the configuration of the tubular body 26 is not limited to the above. As in the case of a second embodiment described later, the tubular body 26 may be formed of one member, or may be formed of a plurality of members.

The flow passage 21 of the bubble generator 2 according to this embodiment has two reduced diameter portions (a first reduced diameter portion 22 and a second reduced diameter portion 23) along a direction along which the liquid L flows, and each reduced diameter portion has the reduced inner diameter and the reduced outer diameter. Gas-liquid mixing portions (a first gas-liquid mixing portion 24 and a second gas-liquid mixing portion 25) are provided downstream of the respective reduced diameter portions such that the gas-liquid mixing portions are contiguous with the respective reduced diameter portions. The number of reduced diameter portions and the number of gas-liquid mixing portions which are contiguous with the reduced diameter portions are set to two in this embodiment. However, such numbers are not limited to two, and may be set to a value greater than two. In the present invention, the plurality of gas-liquid mixing portions 24, 25 are provided. The gas-liquid mixing portion 24, 25 is formed to have an inner diameter (or a cross-sectional area) larger than the minimum inner diameter (or the minimum cross-sectional area) of the reduced diameter portion 22, 23 disposed adjacently upstream of the gas-liquid mixing portion 24, 25. Therefore, due to the combination of the reduced diameter portion and the gas-liquid mixing portion, a Venturi effect is applied to the liquid L or the gas-liquid mixture M flowing through the flow passage 21. In this embodiment, a configuration is adopted where an inner diameter 24$d$ of the first gas-liquid mixing portion is larger than a minimum inner diameter 22$d$ of the first reduced diameter portion, and an inner diameter 25$d$ of the second gas-liquid mixing portion is larger than a minimum inner diameter 23$d$ of the second reduced diameter portion. Accordingly, in this embodiment, the Venturi effect is applied, in the flow passage 21, at two places, that is, at a first Venturi portion formed of the first reduced diameter portion 22 and the first gas-liquid mixing portion 24, and at a second Venturi portion formed of the second reduced diameter portion 23 and the second gas-liquid mixing portion 25.

The pressurized gas G is introduced into the bubble generator 2 according to the present invention by means of the gas supply unit 3. Gas introduction port 28 is formed of a plurality of through holes arranged along the circumferential direction of the outer wall of the tubular body 26 of the bubble generator 2. In this embodiment, the gas introduction port 28 is formed of four circular through holes arranged substantially equidistantly along the peripheral surface of the first tubular body 261, and are disposed in the vicinity of the first reduced diameter portion 22. With such a configuration, the pressurized gas G is forcefully introduced into the flow passage 21 from the vicinity of the first reduced diameter portion 22 which is in a reduced pressure state due to the Venturi effect and, then, the pressurized gas G causes a strong swirling flow to be produced in the first gas-liquid mixing portion 24. Therefore, the pressurized gas G and the liquid L are mixed with each other with certainty in the flow passage 21, so that the gas-liquid mixture M containing a large amount of bubbles can be obtained. In this embodiment, the gas introduction port 28 is formed of four circular through holes. However, the number and the shape of gas introduction ports are not particularly limited.

Further, the flow passage 21 of the bubble generator 2 according to this embodiment is formed such that the minimum inner diameter 23$d$ of the second reduced diameter portion disposed downstream is smaller than the minimum inner diameter 22$d$ of the first reduced diameter portion disposed upstream. With such a configuration, the diameter of bubbles to be generated can be further reduced, so that it is possible to obtain a gas-liquid mixture containing fine bubbles having a bubble diameter of a nano-order level. If the minimum inner diameter 23$d$ of the second reduced diameter portion is set to an excessively small value, pressure loss in the flow passage 21 increases, thus affecting the flow velocity of the gas-liquid mixture M. From such a viewpoint, the minimum inner diameter 23$d$ of the second reduced diameter portion is preferably set to 70 to 98% of the minimum inner diameter 22$d$ of the first reduced diameter portion, and more preferably set to 75 to 95% of the minimum inner diameter 22$d$ of the first reduced diameter portion. Further, in this embodiment, the first gas-liquid mixing portion and the second gas-liquid mixing portion are formed such that the inner diameter 25$d$ of the second gas-liquid mixing portion disposed downstream is larger than the inner diameter 24$d$ of the first gas-liquid mixing portion disposed upstream. With such a configuration, in the flow passage 21, there is a large pressure difference between the second reduced diameter portion 23 and the second gas-liquid mixing portion 25 and hence, shrinkage and collapse of bubbles are promoted at the second gas-liquid mixing portion 25 whereby it is possible to make bubbles even finer.

As described above, in this embodiment, the tubular body 26 having the flow passage 21 therein is formed of the first tubular body 261, which forms the upstream portion of the flow passage 21, and the second tubular body 262, which forms the downstream portion of the flow passage 21. The liquid introduction port 27, the first reduced diameter portion 22, the first gas-liquid mixing portion 24 and the second reduced diameter portion 23 are provided to the first tubular body 261 of these tubular bodies. The second gas-liquid mixing portion 25 and the discharge port 29 are provided to the second tubular body 262 of these tubular bodies. With such a configuration, a pressure resistance of the first reduced diameter portion 22 and the vicinity of the first gas-liquid mixing portion 24 is ensured, the first reduced diameter portion 22 and the vicinity of the first gas-liquid mixing portion 24 are portions of the flow passage 21 to which the largest pressure is applied due to the introduction of the pressurized gas G from the gas supply unit 3. Further, the second reduced diameter portion 23 is provided to the first tubular body 261, and the second tubular body 261 having a larger diameter than the first tubular body 261 is used as the second gas-liquid mixing portion 25. Therefore, the inner diameter of the flow passage 21 at the second reduced diameter portion 23 and the inner diameter of the flow passage 21 at the second gas-liquid mixing portion 25 do not vary continuously, and the inner diameter of the flow passage 21 can be significantly varied at portions downstream of the second reduced diameter portion 23. As described above, a large pressure difference between the second reduced diameter portion 23 and the second gas-liquid mixing portion 25 can be set with an extremely simple configuration, and shrinkage and collapse of bubbles can be promoted.

The bubble generator 2 in this embodiment can be manufactured by a known material and by a known method. For example, in the bubble generator 2 according to this embodiment, an unplasticized PVC pipe having an outer diameter of 18 mm, an inner diameter of 13 mm, and a wall thickness of 2.5 mm is used as the first tubular body 261, and an unplasticized PVC pipe having an outer diameter of 24 mm, an inner diameter of 18 mm, and a wall thickness of 3 mm is used as the second tubular body 262. The first reduced diameter portion 22 of the first tubular body 261 is provided by performing drawing on the outer periphery of the PVC pipe until the minimum inner diameter of the PVC pipe becomes approximately 7 to 10 mm. A region of the first tubular body 261 ranging from the first reduced diameter portion 22 to a point approximately 7 to 10 cm away from the first reduced diameter portion 22 is taken as the first gas-liquid mixing portion 24. The second reduced diameter portion 23 disposed downstream of the first gas-liquid mixing portion 24 is manufactured such that drawing is performed on the outer periphery of the PVC pipe and, thereafter, the pipe is cut to have an end portion thereof having the minimum inner diameter of approximately 6 to 9 mm. Further, the gas introduction port 28 is formed such that four through holes each having a diameter of 2.5 mm are formed between the first reduced diameter portion 22 and the first gas-liquid mixing portion 24 at angular intervals of approximately 90 degrees in the circumferential direction of the outer wall of the first tubular body 261. The first tubular body 261 and the second tubular body 262 are obtained as described above, and the bubble generator 2 according to this embodiment is obtained by fitting the second tubular body 262 on the first tubular body 261. It is noted that the above-mentioned specifications, such as numerical values, and material of the tubular body 26 are merely given for the sake of example, and various specifications and materials may be selected depending on the usage and the like.

Next, the gas supply unit 3 will be described with reference to FIG. 1 and FIG. 2. The gas supply unit 3 in this embodiment is formed of a compressor 30, a pipe 31, a casing 34 having a gas supply port 33, nuts 35, and a connecting member 32 having one end thereof connected to the pipe 31 and the other end thereof connected to the casing 34. Of these components, the compressor 30 (compressor) is a device for pressurizing a gas to atmospheric pressure or more. A specific pressure of a pressurized gas can be adjusted by adjusting the flow rate of the liquid L to be introduced into the bubble generator 2. The specific pressure of the pressurized gas is preferably set to 0.15 to 0.20 MPa, and is more preferably set to 0.18 MPa or more and less than 0.20 MPa. The gas G pressurized by this compressor 30 is transferred to the bubble generator 2 through the pipe 31 and the connecting member 32. The casing 34 having a cylindrical shape is concentrically fixed to the outer periphery of the bubble generator 2 at a position in the vicinity of the first reduced diameter portion 22 of the first tubular body 261, and both end portions of such a cylindrical body are airtightly fixed to the first tubular body 261 with the nuts 35 and spacers. The casing 34 has one gas supply port 33 formed of a through hole which penetrates the outer wall of the casing 34, and the inner peripheral wall of this gas supply port 33 has threads which can be threadedly engaged with a thread groove formed at one end of the connecting member 32. Therefore, causing one end of the connecting member 32 to be threadedly engaged with the gas supply port 33 of the casing 34 allows the connecting member 32 and the casing 34 to be airtightly connected with each other, and the pressurized gas G transferred from the compressor 30 is transferred into the gas supply port 33 of the casing 34. In this embodiment, the casing 34 is fixed in the vicinity of the first reduced diameter portion 22 and hence, a gap 36 is formed between the inner periphery of the casing 34 and the outer periphery of the first tubular body 261 of the bubble generator 2 in the circumferential direction by an amount which corresponds to the reduction in the diameter of the first tubular body. Accordingly, the gas supply port 33 of the gas supply unit 3 and the gas introduction port 28 of the bubble generator 2 communicate with each other through this gap 36. The pressurized gas G supplied from the gas supply port 33 of the casing 34 is introduced into the gas introduction port 28 of the bubble generator 2 through this gap 36 formed on the outer periphery of the first reduced diameter portion 22.

Next, the manner of operation of the fine bubble generating device 1 according to this embodiment during usage will be described with reference to FIG. 3. The compressor 30 of the gas supply unit 3, the faucet 6 which is a liquid supply source, the hose and the adaptor 4 through which the liquid L from the faucet 6 is transferred into the liquid introduction port 27 of the bubble generator 2, and the shower head 5 are omitted in FIG. 3.

First, when the faucet 6 which is the liquid supply source is opened, as shown in FIG. 3(a), the liquid L is introduced into the liquid introduction port 27 of the bubble generator 2 in a continuous manner. In the case where the liquid L introduced is water supplied from water pipe for water supply, the hydraulic pressure of the liquid L is approximately 0.05 to 0.3 MPa, for example, and the liquid L can be directly used without pressurizing the liquid L using a pump or the like by introducing the liquid L from the liquid introduction port 27. The liquid L flows through the flow passage 21 along the flow direction F. The inner diameter (cross-sectional area) of the flow passage 21 is reduced at the first reduced diameter portion 22 and hence, the flow velocity of the liquid L increases at the first reduced diameter portion 22 due to a Venturi effect whereby a pressure is reduced in the vicinity of the first reduced diameter portion 22.

Whereas, when the compressor 30 is operated, as shown in FIG. 3(a), a gas G pressurized to atmospheric pressure or more is transferred into the gas supply port 33 through the pipe 31 and the connecting member 32. The pressurized gas G transferred into the gas supply port 33 is introduced into the gas introduction port 28 of the bubble generator through the gap 36 formed between a portion of the first tubular body 261 in the vicinity of the first reduced diameter portion 22 and the casing 34. At this point of operation, the portion of the flow passage 21 in the vicinity of the first reduced diameter portion 22 is in a reduced pressure state where a pressure is reduced due to the Venturi effect. Therefore, there is a large pressure difference between a pressure at such a portion and the gas G pressurized to the atmospheric pressure or more and hence, a large amount of gas is suctioned and introduced into the flow passage 21 with a strong force from the gas introduction port 28 formed in the vicinity of the first reduced diameter portion 22.

As shown in FIG. 3(a), the gas introduction port 28 of the bubble generator 2 is formed of the through holes arranged along the circumferential direction of the outer wall of the first tubular body 261 and hence, the flow velocity of the pressurized gas G introduced into the flow passage 21 is further increased. Therefore, the pressurized gas G forcefully introduced into the flow passage 21 from the gas introduction port 28 causes the liquid L flowing through the first gas-liquid mixing portion 24 to produce a strong swirling flow. Accordingly, a large amount of gas G is introduced into the flow passage 21, and the gas G and the liquid L are mixed with certainty in this first gas-liquid mixing portion 24, so that it is possible to obtain a gas-liquid mixture M containing a large amount of bubbles, that is, the gas-liquid mixture M where the concentration of fine bubbles in the mixture is high. Further, the pressurized gas G is introduced into the flow passage 21 from the gas introduction port 28 formed of the through holes at a high flow velocity, so that the flow velocity of the gas-liquid mixture M flowing through the flow passage 21 is increased.

Figure 3:
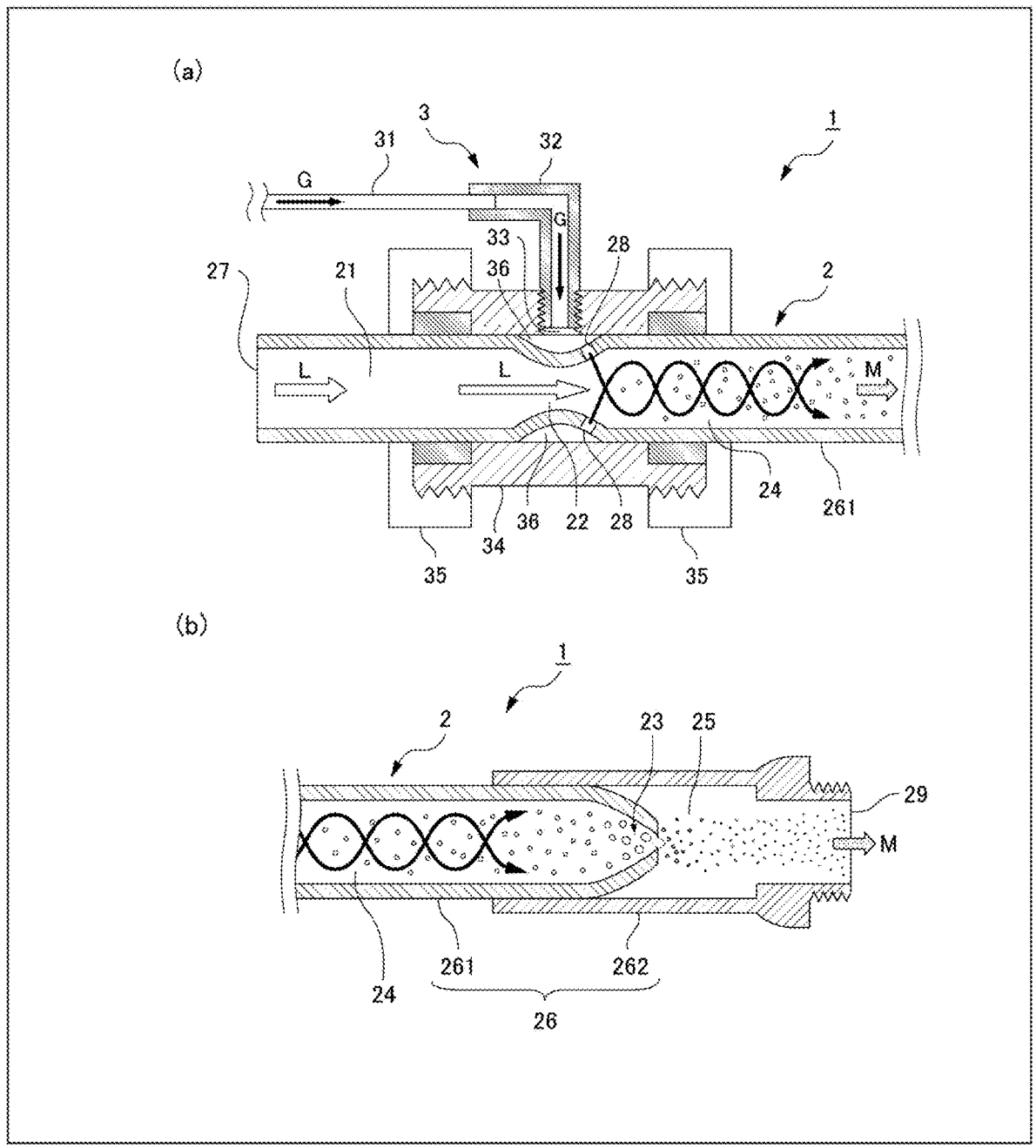
FIG. 3 is a partially enlarged cross-sectional view showing the manner of operation of the fine bubble generating device shown in FIG. 1.

Subsequently, as shown in FIG. 3(*b*), the gas-liquid mixture M produced in the first gas-liquid mixing portion 24 flows through the flow passage 21 along the flow direction F, and passes through the second reduced diameter portion 23. At this point of operation, the inner diameter (cross-sectional area) of the flow passage 21 is reduced at the second reduced diameter portion 23 and hence, the flow velocity of the gas-liquid mixture M increases at the second reduced diameter portion 23 due to the Venturi effect whereby a pressure is reduced in the vicinity of the second reduced diameter portion 23. Therefore, bubbles contained in the gas-liquid mixture M expand once at the second reduced diameter portion 23. Then, the gas-liquid mixture M moves to the second gas-liquid mixing portion 25. This second gas-liquid mixing portion 25 has a large inner diameter, so that the flow velocity of the gas-liquid mixture M reduces, and the pressure increases. Accordingly, bubbles which expand once at the second reduced diameter portion 23 shrink and collapse in this second gas-liquid mixing portion 25 and hence, the bubbles are made fine. The bubble generator 2 according to this embodiment is designed such that the minimum inner diameter 23*d* of the second reduced diameter portion is smaller than the minimum inner diameter 22*d* of the first reduced diameter portion, and the inner diameter 25*d* of the second gas-liquid mixing portion is larger than the inner diameter 24*d* of the first gas-liquid mixing portion. Due to such a design, there is a larger pressure difference between the second reduced diameter portion 23 and the second gas-liquid mixing portion 25. Therefore, bubbles which expand in the second reduced diameter portion 23 are caused to rapidly shrink and collapse in the second gas-liquid mixing portion 25 and hence, it is possible to obtain fine bubbles having a smaller bubble diameter, that is, fine bubbles of a nano-order level. The gas-liquid mixture M containing fine bubbles obtained as described above is discharged from the discharge port 29, and is released through the shower head 5 or the like. Further, the flow passage 21 of the bubble generator 2 extends substantially along the same axis from the liquid introduction port 27 to the discharge port 29 and hence, high flow velocities of the liquid L and the gas-liquid mixture M flowing through the flow passage 21 are maintained whereby the gas-liquid mixture M released from the discharge port 29 has a suitable hydraulic pressure.

Figure 2:
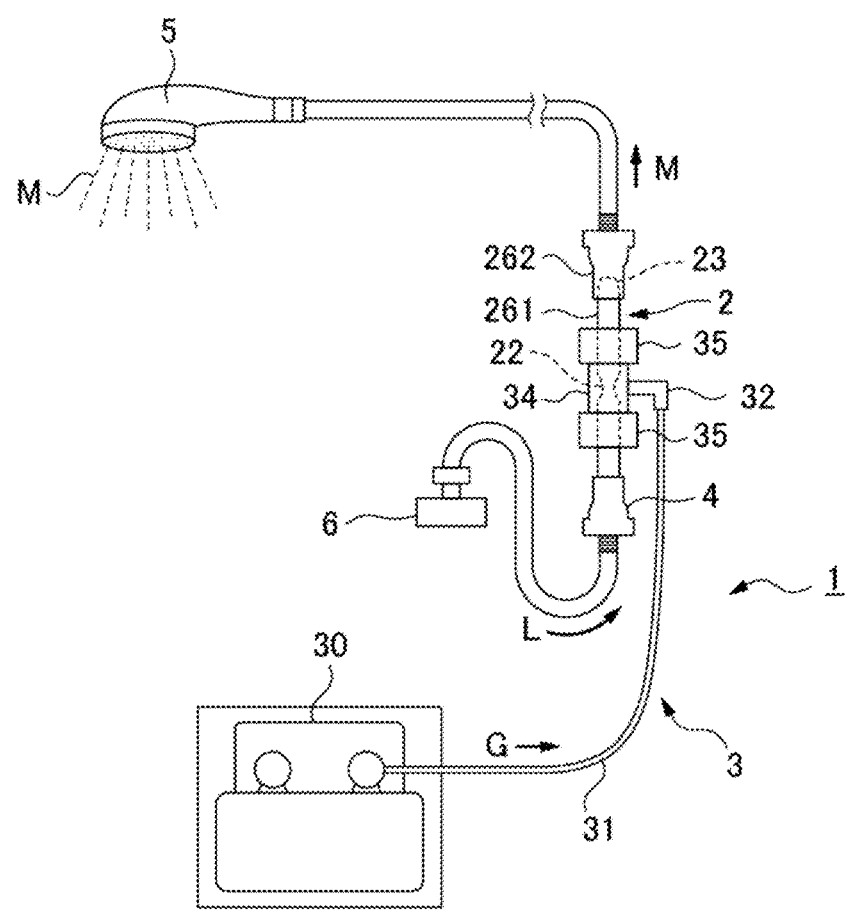
FIG. 2 is a view showing a use state of the fine bubble generating device shown in FIG. 1.

As shown in FIG. 2, the gas-liquid mixture M is taken out to the outside from the discharge port 29 of the fine bubble generating device 1 through the hose and the shower head 5. The shower head 5 has an effect of increasing hydraulic pressure in the device as a whole before the gas-liquid mixture M is released to the outside. Therefore, by forming the fine bubble generating device 1 by attaching the shower head 5 to the bubble generator 2, the amount of bubbles contained in the gas-liquid mixture M is increased and hence, it is possible to obtain a gas-liquid mixture where the concentration of fine bubbles in the mixture is high. Further, when a water spray plate having the small number of water discharge holes or having water discharge holes with a small diameter is selected as the water spray plate of the shower head 5, hydraulic pressure can be further increased before the gas-liquid mixture M is released to the outside and hence, it is possible to obtain a gas-liquid mixture M containing fine bubbles which are made even finer, that is, which have a bubble diameter of a nano-order level. The diameter of the water discharge hole formed in the water spray plate of the shower head 5 is preferably set to 0.5 mm or less, more preferably set to 0.4 mm or less, and particularly preferably set to 0.3 mm or less. Depending on the usage, an attachment, such as a straight nozzle or a jet nozzle, may be used in place of the shower head 5. In general, water and air are used as the liquid L and the gas G supplied to the fine bubble generating device 1. However, the liquid L and gas G are not limited to the above, and various liquids or gases may be used depending on the usage.

Figure 4:
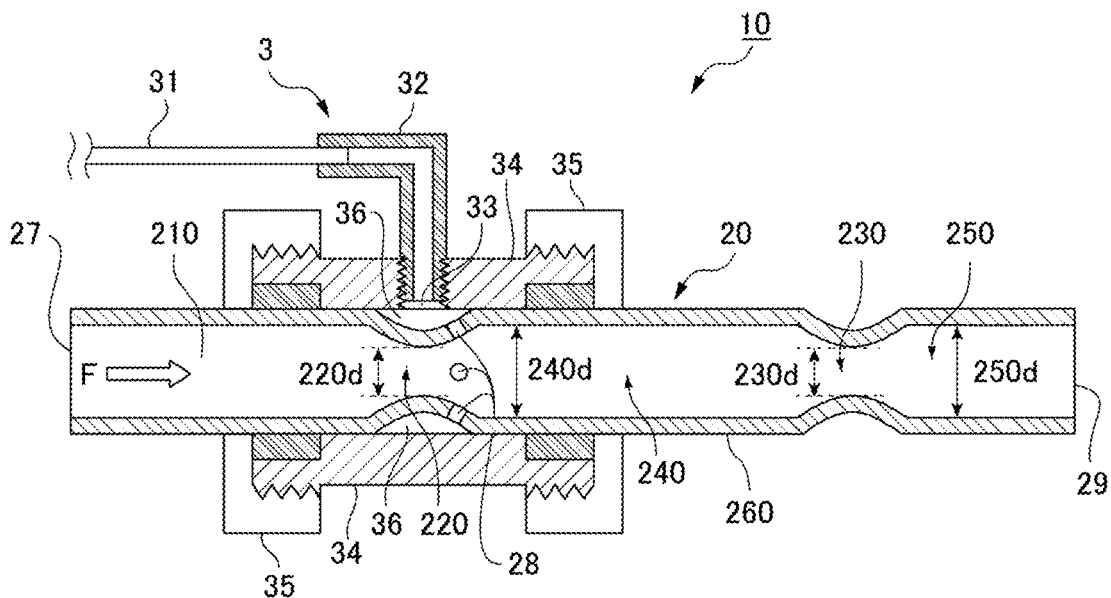
FIG. 4 is a cross-sectional view schematically showing a fine bubble generating device according to a second embodiment of the present invention.

Next, the second embodiment of the present invention will be described with reference to FIG. 4.

A fine bubble generating device 10 according to the second embodiment of the present invention is roughly formed of a bubble generator 20 and the gas supply unit 3. In this embodiment, constitutional components identical to the corresponding constitutional components in the first embodiment will be described using the same reference numerals.

The bubble generator 20 of this embodiment will be described with reference to FIG. 4. The bubble generator 20 of this embodiment is formed of one tubular body 260 having a substantially tubular shape. The tubular body 260 has a flow passage 210 therein, and the flow passage 210 is formed of a space through which a liquid L or a gas-liquid mixture M flows. The flow passage 210 is formed of the space in the tubular body 260. Although the cross-sectional area or the inner diameter of the flow passage 210 varies, the flow passage 210 ranging from the liquid introduction port 27 to the discharge port 29 is formed to extend substantially along the same axis. In this embodiment, the tubular body 260 is formed of one member. However, the configuration of the tubular body 260 is not limited to the above. As in the case of the first embodiment, the tubular body 260 may be formed of a plurality of members.

The flow passage 210 of the bubble generator 20 according to this embodiment has two reduced diameter portions (a first reduced diameter portion 220 and a second reduced diameter portion 230) along a direction along which the liquid L flows, and each reduced diameter portion has the reduced inner diameter and the reduced outer diameter. Gas-liquid mixing portions (a first gas-liquid mixing portion 240 and a second gas-liquid mixing portion 250) are provided downstream of the respective reduced diameter portions such that the gas-liquid mixing portions are contiguous with the respective reduced diameter portions. The number of reduced diameter portions and the number of gas-liquid mixing portions each of which is contiguous with the reduced diameter portion are set to two in this embodiment. However, such numbers are not limited to two, and may be set to a value greater than two. In the present invention, the plurality of gas-liquid mixing portions 240, 250 are provided. The gas-liquid mixing portion 240, 250 is formed to have an inner diameter (or a cross-sectional area) larger than the minimum inner diameter (or the minimum cross-sectional area) of the reduced diameter portion 220, 230 disposed adjacently upstream of the gas-liquid mixing portion 240, 250. Therefore, due to the combination of the reduced diameter portion and the gas-liquid mixing portion, a Venturi effect is applied to the liquid L or the gas-liquid mixture M flowing through the flow passage 210. In this embodiment, a configuration is adopted where an inner diameter 240d of the first gas-liquid mixing portion is larger than a minimum inner diameter 220d of the first reduced diameter portion, and an inner diameter 250d of the second gas-liquid mixing portion is larger than a minimum inner diameter 230d of the second reduced diameter portion. Accordingly, in this embodiment, the Venturi effect is applied, in the flow passage 210, at two places, that is, at a first Venturi portion formed of the first reduced diameter portion 220 and the first gas-liquid mixing portion 240, and at a second Venturi portion formed of the second reduced diameter portion 230 and the second gas-liquid mixing portion 250.

Further, the flow passage 210 of the bubble generator 20 according to this embodiment is formed such that the minimum inner diameter 220d of the first reduced diameter portion disposed upstream is substantially equal to the minimum inner diameter 230d of the second reduced diameter portion disposed downstream. The flow passage 210 is also formed such that the inner diameter 240d of the first gas-liquid mixing portion disposed upstream is substantially equal to the inner diameter 250d of the second gas-liquid mixing portion disposed downstream. Therefore, the bubble generator 20 according to this embodiment can be obtained by reducing the diameter of a straight pipe having a predetermined diameter at two places and hence, the bubble generator 20 can be easily manufactured. The bubble generator 20 in this embodiment can be manufactured by a known material and by a known method. For example, in the bubble generator 20 according to this embodiment, an unplasticized PVC pipe having an outer diameter of 26 mm, an inner diameter of 20 mm, and a wall thickness of 3 mm is used as the tubular body 260. The first reduced diameter portion 220 of the tubular body 260 is provided by performing drawing on the outer periphery of the PVC pipe until the minimum inner diameter of the PVC pipe becomes approximately 15 mm. A region of the tubular body 260 ranging from the first reduced diameter portion 220 to a point approximately 7 to 10 cm away from the first reduced diameter portion 220 is taken as the first gas-liquid mixing portion 240. The second reduced diameter portion 230 disposed downstream of the first gas-liquid mixing portion 240 is provided such that drawing is performed on the outer periphery of the PVC pipe until the minimum inner diameter of the PVC pipe becomes approximately 15 mm in the same manner as the first reduced diameter portion 220. It is noted that the above-mentioned specifications, such as numerical values, and material of the tubular body 260 are merely given for the sake of example, and various specifications and materials may be selected depending on the usage and the like.

Other descriptions with respect to the configurations of the gas supply unit 3 and the bubble generator 20 are substantially equal to those in the above-mentioned first embodiment, and the functions and the manner of operation and advantageous effects of the gas supply unit 3 and the bubble generator 20 are also substantially equal to those in the above-mentioned first embodiment. Further, other components which form the fine bubble generating device 10 are also substantially equal to those in the above-mentioned first embodiment, and the functions and the manner of operation and advantageous effects of such components are also substantially equal to those in the above-mentioned first embodiment.

EXAMPLE

Hereinafter, the present invention will be described in more detail with reference to examples. However, the present invention is not limited to these examples at all.

Example 1

1. Measurement (1) of Particle Diameter and the Like of Fine Bubbles Contained in Gas-Liquid Mixture After a gas-liquid mixture M was generated using a fine bubble generating device 1, particle diameter distribution of fine bubbles contained in the gas-liquid mixture M, the amount of dissolved oxygen in the gas-liquid mixture M, and the water pressure of the gas-liquid mixture M released from a discharge port 29 of a bubble generator 2 were measured. A laser diffraction particle size Analyzer (model number: SALD-3100, made by SHIMADZU CORPORATION) was used for measuring particle diameter distribution of fine bubbles, and a digital dissolved oxygen meter (model number: DO-5509, made by MOTHERTOOL CO., LTD.) was used for measuring the amount of dissolved oxygen.

The device 1 according to the first embodiment shown in FIG. 1 and FIG. 2 was used as the fine bubble generating device 1, and the measurement was performed in a state where the bubble generator 2, a gas supply unit 3, and a shower head 5 are connected with each other. Specifically, an unplasticized PVC pipe having an outer diameter of 18 mm, an inner diameter of 13 mm, and a wall thickness of 2.5 mm was used as a first tubular body 261, an unplasticized PVC pipe having an outer diameter of 24 mm, an inner diameter of 18 mm, and a wall thickness of 3 mm was used as a second tubular body 262, and the entire length of the bubble generator 2 was set to 20.6 cm. A first reduced diameter portion 22 of the first tubular body 261 was formed by performing drawing on the outer periphery of the PVC pipe until the minimum inner diameter of the PVC pipe becomes 8 mm. A second reduced diameter portion 23 was formed such that drawing was performed on the outer periphery of the PVC pipe and, thereafter, the pipe was cut to have an end portion thereof having the minimum inner diameter of 6.4 mm. Further, a gas introduction port 28 was formed such that four through holes each having a diameter of 2.5 mm were formed between the first reduced diameter portion 22 and the first gas-liquid mixing portion 24 at angular intervals of approximately 90 degrees in the circumferential direction of the outer wall of the first tubular body 261. The gas supply unit 3 was formed as shown in FIG. 1 and FIG. 2. An air compressor SR-045 (made by Fujiwara Sangyo Co., Ltd., model number: SRL04SPT-01) was used as the compressor 30, and the compressor 30 was connected to the bubble generator 2 through a pipe 31, a connecting member 32 and a casing 34. A tap for water supply was used for a faucet 6, and a hose was directly connected to the tap. The hose was connected to the bubble generator 2 through the adaptor 4. A shower head including a water spray plate with water discharge holes having a small diameter, that is, 0.3 mm (made by Arromic CO., LTD, product name: pro shower clear ProC-48N) was used as the shower head 5.

Conditions of an experiment were such that a pressurized gas G is air, and a pressure of the pressurized gas caused by a compressor is 0.19 MPa. Further, the water pressure of a liquid L supplied from the faucet 6 to the bubble generator 2, that is water, was set to 0.15 MPa, and the flow rate of water was set to 20 L/min.

Example 2

2. Measurement (2) of Particle Diameter and the Like of Fine Bubbles Contained in Gas-Liquid Mixture A fine bubble generating device 1' (no shower head 5) is configured such that the shower head 5 is omitted from the fine bubble generating device 1 used in the example 1. With the configuration and under conditions substantially equal to those in the example 1 except for the use of the fine bubble generating device 1', the particle diameter distribution of fine bubbles contained in the generated gas-liquid mixture M, the amount of dissolved oxygen in the gas-liquid mixture M, and the water pressure of the gas-liquid mixture M released from the discharge port 29 of the bubble generator 2 were measured.

Comparison Example

3. Measurement (3) of Particle Diameter and the Like of Fine Bubbles Contained in Gas-Liquid Mixture A fine bubble generating device (comparative product) is configured such that the bubble generator 2 and the gas supply unit 3 of the fine bubble generating device 1 used in the example 1 are replaced with a bubble generator and a gas supply unit described in detail hereinafter. Under conditions substantially equal to those in the example 1 except for the use of the fine bubble generating device (comparative product), the particle diameter distribution of fine bubbles contained in the generated gas-liquid mixture M, the amount of dissolved oxygen in the gas-liquid mixture M, and the water pressure of the gas-liquid mixture M released from the discharge port of the bubble generator were measured.

Figure 5:
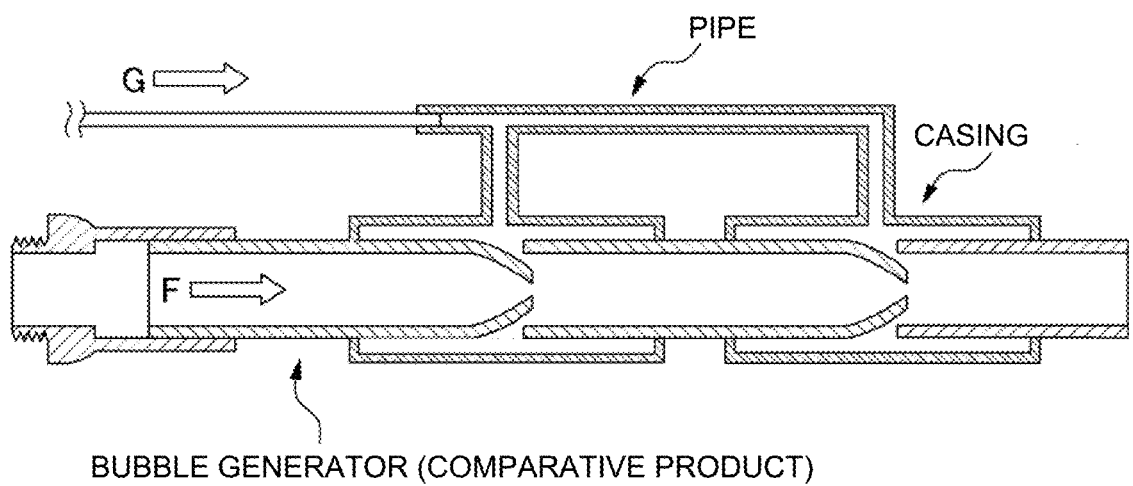
FIG. 5 is a cross-sectional view schematically showing a portion of a fine bubble generating device used in a comparison example.

As shown in FIG. 5, the bubble generator and the gas supply unit in this comparison example were configured as follows. An unplasticized PVC pipe having a length of 10 cm, an outer diameter of 18 mm, an inner diameter of 13 mm, a wall thickness of 2.5 mm, and both open ends was used, and the diameter of the unplasticized PVC pipe was reduced at one end thereof by performing drawing on the outer periphery of the one end to set the inner diameter of the one end to 8 mm. Two unplasticized PVC pipes each having such a configuration were formed, and these two pipes were coaxially arranged such that one end the diameter of which is reduced is disposed downstream in a direction along which a liquid flows. In addition to the above, an unplasticized PVC pipe the diameter of which is not reduced was disposed on the discharge port side from which the liquid is discharged. A clearance into which a pressurized gas G is supplied was formed between one pipe (one end the diameter of which is reduced) and the other pipe (the other end the diameter of which is not reduced). Both end portions consisting of the end portion of the one pipe (the one end the diameter of which is reduced) and the end portion of the other pipe (the other end the diameter of which is not reduced) were accommodated in a cylindrical casing, and both end portions of the casing were fixed to the outer walls of the respective pipes to bring the casing into an airtight state. A configuration was adopted where a pipe for supplying a pressurized gas is connected to the casing, and the pressurized gas G produced by an air compressor SR-045 (made by Fujiwara Sangyo Co., Ltd., model number: SRL04SPT-01) is supplied, through the pipe and the casing, into the pipe through the clearance formed between the one pipe (the one end the diameter of which is reduced) and the other pipe (the other end the diameter of which is not reduced). The entire length was approximately 30 cm.

Figure 6:
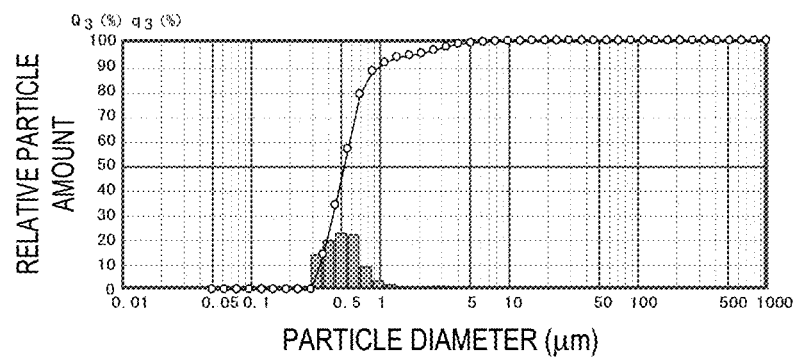
FIG. 6 is a graph showing particle size distribution of fine bubbles contained in a gas-liquid mixture obtained in an example 1.
Figure 7:
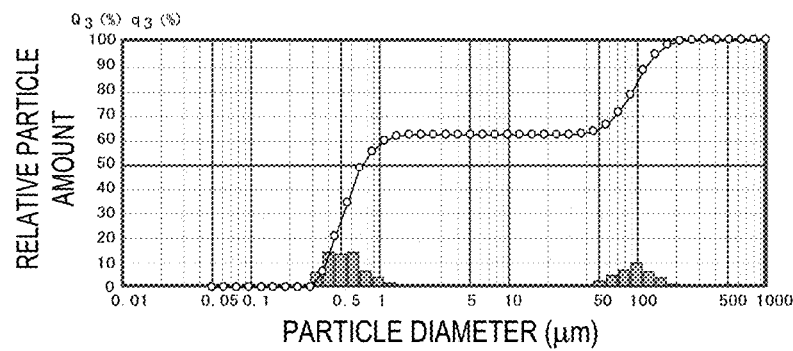
FIG. 7 is a graph showing particle size distribution of fine bubbles contained in a gas-liquid mixture obtained in an example 2.
Figure 8:
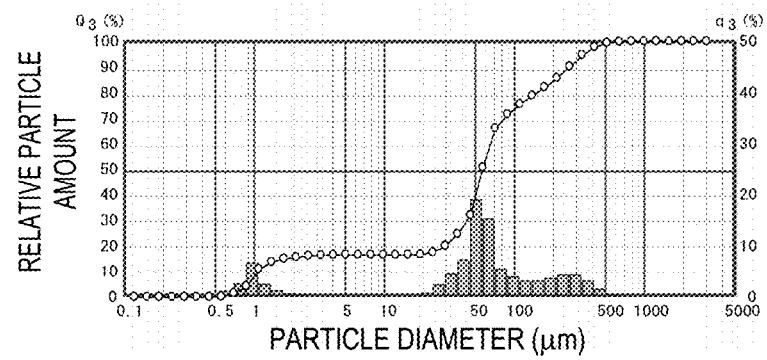
FIG. 8 is a graph showing particle size distribution of fine bubbles contained in a gas-liquid mixture obtained in the comparison example.

The results of the examples 1, 2 and the comparison example are shown in FIGS. 6 to 8 and the following Table 1. As shown in FIG. 6 to FIG. 8, it is found that adopting the configuration of the fine bubble generating device of the present invention allows a gas-liquid mixed water containing a large amount of fine bubbles of a nano-order level (bubble diameter of less than 1 μm) to be obtained. Specifically, in the gas-liquid mixed water obtained by the fine bubble generating device of the example 1, the integrated value of the amount of gas-liquid mixed water containing bubbles having a diameter of less than 1 μm was approximately 90%. In the gas-liquid mixed water obtained in the example 2, the integrated value of the amount of gas-liquid mixed water containing bubbles having a diameter of less than 1 μm was approximately 58%. In contrast, in the gas-liquid mixed water obtained in the comparison example, the integrated value of the amount of gas-liquid mixed water containing bubbles having a diameter of less than 1 μm was small, that is, approximately 10%. From such results, it is found that adopting the configuration of the fine bubble generating device of the present invention allows a gas-liquid mixed water having a high abundance ratio of fine bubbles of a nano-order level to be obtained. It is also found that adopting the configuration including the shower head allows a gas-liquid mixed water having a higher abundance ratio of fine bubbles of a nano-order level to be obtained. As shown in the following Table 1, it is found that adopting the fine bubble generating device of the present invention allows a gas-liquid mixed water to be released to the outside of the device with the water pressure of supplied water substantially maintained or increased. Therefore, even when water is supplied into the device at a water pressure at which water is supplied from a water pipe for water supply, the water can be released to the outside of the device in the form of a gas-liquid mixed water with the same water pressure or an increased water pressure. Accordingly, it is unnecessary to pressurize water with a pump or the like to supply the water and hence, the device is allowed to have a simple configuration. Further, the amount of dissolved oxygen in the gas-liquid mixed water obtained by the fine bubble generating device of the present invention was higher than the amount of dissolved oxygen in supplied water, and it was found from the measurement results of particle size distribution that the gas-liquid mixed water obtained by the fine bubble generating device of the present invention has a high abundance ratio of fine bubbles of a nano-order level. Accordingly, it was estimated that the concentration of fine bubbles contained in the gas-liquid mixed water M is high. When the configuration (the example 1) where the fine bubble generating device includes the shower head is adopted, the concentration of dissolved oxygen is further increased, and the abundance ratio of fine bubbles of a nano-order level is also increased. Accordingly, it was also found that adopting such a configuration allows gas-liquid mixed water with a particularly high concentration of fine bubbles to be obtained.

TABLE 1

| Measurement item | Example 1 (bubble generator + shower head) | Example 2 (only bubble generator) | Comparison example (bubble generator + shower head) |
| --- | --- | --- | --- |
| Water pressure of supplied water (MPa) | 0.15 | 0.15 | 0.15 |
| Water pressure of gas- | 0.21 | 0.14 | 0.21 |

TABLE 1-continued

| Measurement item | Example 1 (bubble generator + shower head) | Example 2 (only bubble generator) | Comparison example (bubble generator + shower head) |
|---|---|---|---|
| liquid mixture M (MPa) | | | |
| Amount of dissolved oxygen in supplied water (mg/L) | 8.2 | 8.2 | 8.2 |
| Amount of dissolved oxygen in gas-liquid mixture M (mg/L) | 10.8 | 9.8 | 10.0 |

Example 3

Figure 9:
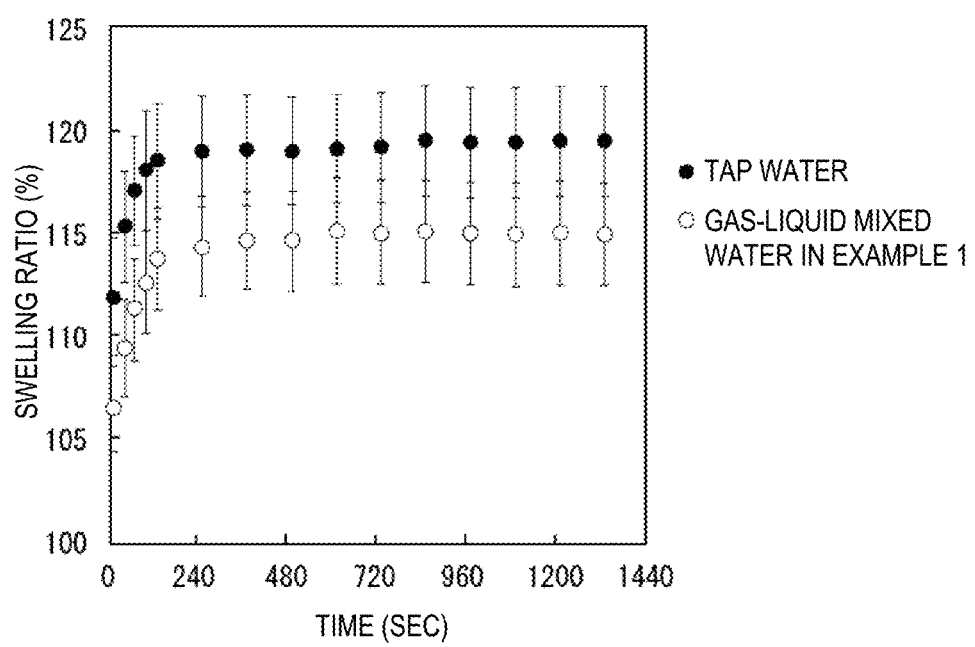
FIG. 9 is a graph showing a swelling ratio of hair in an example 3.

4. Examination of Condition of Hair when Gas-Liquid Mixed Water is Used for Hair Washing or the Like An examination was performed on the condition of hair when the gas-liquid mixed water M obtained by the fine bubble generating device of the present invention was used for hair washing or the like. One hair (in a healthy state, and without dyeing, bleaching or the like) of a person was fixed to a preparation, and a cover glass was placed on the preparation and, thereafter, gas-liquid mixed water obtained in the example 1 was supplied to the hair from the side of the cover glass to immerse the hair in the gas-liquid mixed water. The diameter of the hair was measured by a microscope for twenty minutes. Further, substantially the same test was carried out using tap water in place of the gas-liquid mixed water in the example 1. The results are shown in the graph in FIG. 9.

According to such results, it was found that performing treatment on hair with the gas-liquid mixed water in the example 1 can reduce the swelling ratio of hair by approximately 5% or more compared with hair on which treatment was performed with tap water. It has been considered that washing hair with tap water allows water to permeate into hair, so that the hair swells. Therefore, even if hair dyeing agent or treatment agent is used after hair is washed, such an agent does not permeate into the hair and hence, it is difficult to obtain advantageous effects of such an agent. However, washing hair with the gas-liquid mixed water obtained by the fine bubble generating device of the present invention can reduce the swelling ratio of hair and hence, the hair still has room to swell. Therefore, even after hair is washed, the hair dyeing agent, the treatment agent or the like can be permeated into the hair. Accordingly, when the gas-liquid mixed water produced by the fine bubble generating device of the present invention is used for hair washing, the hair dyeing agent or the treatment agent can be used after dirt on hair or scalp is removed and hence, advantageous effects of these hair dyeing agent and the like can be stably obtained.

The present invention is not limited to the above-mentioned embodiments or examples, and various embodiments to which design change is added without departing from the gist of the invention described in Claims are also included in the technical scope.

INDUSTRIAL APPLICABILITY

The fine bubble generating device according to the present invention is used to produce gas-liquid mixture containing fine bubbles, and may be preferably used in the field of beauty and health, the field of agriculture and other fields.

REFERENCE SIGNS LIST 1, 10 fine bubble generating device
2, 20 bubble generator
21, 210 flow passage
22, 220 first reduced diameter portion
22$d$, 220$d$ minimum inner diameter of first reduced diameter portion
23, 230 second reduced diameter portion
23$d$, 230$d$ minimum inner diameter of second reduced diameter portion
24, 240 first gas-liquid mixing portion
24$d$, 240$d$ inner diameter of first gas-liquid mixing portion
25, 250 second gas-liquid mixing portion
25$d$, 250$d$ inner diameter of second gas-liquid mixing portion
26, 260 tubular body
261 first tubular body
262 second tubular body
27 liquid introduction port
28 gas introduction port (through hole)
29 discharge port
3 gas supply unit
30 compressor
31 pipe
32 connecting member
33 gas supply port
34 casing
35 nut
36 gap
4 adaptor
5 shower head
6 faucet
F flow direction
G pressurized gas
L liquid
M gas-liquid mixture

The invention claimed is:

1. A fine bubble generating device which generates fine bubbles by mixing a liquid continuously supplied from a liquid supply source and a gas supplied from a gas supply unit, and which discharges a gas-liquid mixture obtained by mixing the fine bubbles and the liquid together, the fine bubble generating device comprising:

a bubble generator including a tubular body, a liquid introduction port, a gas introduction port, and a discharge port, the tubular body having a flow passage for the liquid in the tubular body, the liquid being introduced into the flow passage through the liquid introduction port, the gas being introduced into the flow passage through the gas introduction port, the gas-liquid mixture being discharged from the flow passage through the discharge port;

a gas supply unit including a compressor and a gas supply port, the compressor being configured to pressurize the gas, the gas pressurized by the compressor being supplied to the bubble generator through the gas supply port, and a shower head connected to the bubble generator through a hose connected to the discharge port of the bubble generator, wherein the flow passage of the bubble generator extends substantially along a same axis from the liquid introduction port to the discharge port, a plurality of reduced diameter portions each having an inner diameter reduced are provided to the flow passage along a direction along which the liquid flows, and gas-liquid mixing portions are provided downstream of the respective reduced diameter portions in a contiguous manner, each of the gas-liquid mixing portions having an inner diameter larger than a minimum inner diameter of each of the plurality of reduced diameter portions, the gas introduction port of the bubble generator is formed of a plurality of through holes arranged along a circumferential direction of an outer wall of the tubular body, and is provided in a vicinity of a most upstream reduced diameter portion of the plurality of reduced diameter portions provided to the flow passage, and the gas introduction port communicates with the gas supply port of the gas supply unit, and the tubular body comprises the plurality of reduced diameter portions provided to the flow passage of the bubble generator, wherein the flow passage of the bubble generator has, from an upstream side to a downstream side of the flow passage, a first reduced diameter portion, a first gas-liquid mixing portion which is contiguous with the first reduced diameter portion, a second reduced diameter portion which is contiguous with the first gas-liquid mixing portion, and a second gas-liquid mixing portion which is contiguous with the second reduced diameter portion, wherein the first reduced diameter portion includes portions where the inner diameters are reduced and enlarged, and the second reduced diameter portion includes a portion where the inner diameter is reduced, the plurality of reduced diameter portions of the bubble generator is formed such that the minimum inner diameter of the second reduced diameter portion disposed downstream is smaller than the minimum inner diameter of the first reduced diameter portion disposed upstream, and the gas-liquid mixing portions of the bubble generator are formed such that the inner diameter of the second gas-liquid mixing portion disposed downstream is larger than the inner diameter of the first gas-liquid mixing portion disposed upstream.

2. The fine bubble generating device according to claim 1, wherein in the flow passage of the bubble generator, portions of the tubular body which correspond to the first reduced diameter portion, the first gas-liquid mixing portion which is contiguous with the first reduced diameter portion, and the second reduced diameter portion which is contiguous with the first gas-liquid mixing portion are integrally and coaxially formed.

3. The fine bubble generating device according to claim 1, wherein the plurality of reduced diameter portions of the bubble generator is formed such that the minimum inner diameter of the second reduced diameter portion is set to 75 to 95% of the minimum inner diameter of the first reduced diameter portion.

4. The fine bubble generating device according to claim 1, wherein the minimum inner diameter of the first reduced diameter portion is 7 to 10 mm, and the minimum inner diameter of the second reduced diameter portion is 6 to 9 mm.

* * * * *